Patented Aug. 15, 1944

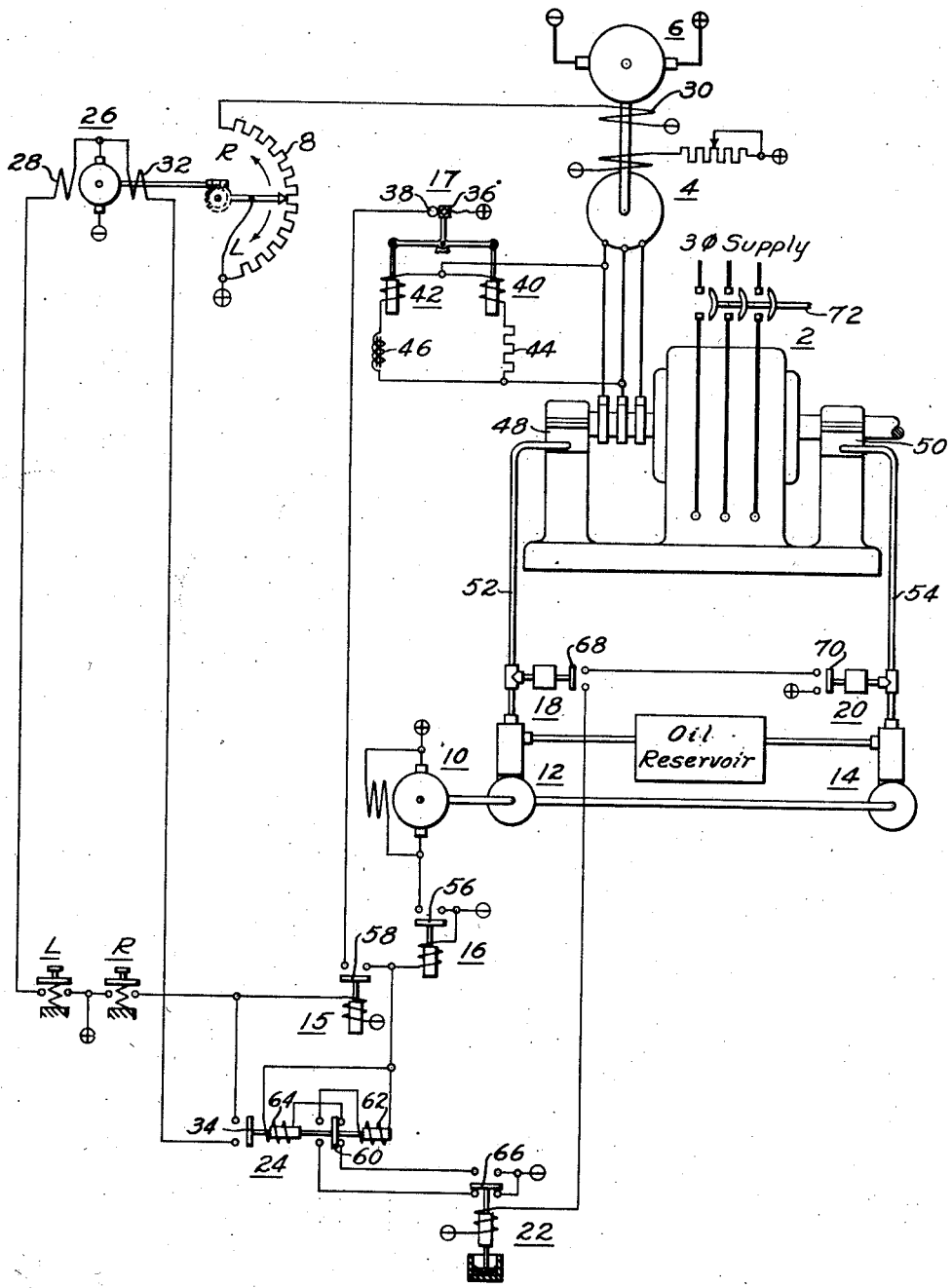

2,356,070

UNITED STATES PATENT OFFICE 2,356,070

CONTROL SYSTEM

Robert R. Longwell, Forest Hills, Pa., assignor to Westinghouse Electric & Manufacturing Company, East Pittsburgh, Pa., a corporation of Pennsylvania Application October 28, 1942, Serial No. 463,615

8 Claims. (Cl. 172—274)

The present invention relates, generally, to control systems, and more particularly, to control systems for variable speed induction motors.

In the operation of extremely large motors it is necessary that oil be applied to the motor bearings at a high pressure in order to lift the rotor and insure that there is a sufficient film of oil between the bearing surfaces before the rotor is allowed to rotate. This precaution is necessary to avoid damage to the motor bearings that may be caused by starting the motor without a sufficient oil film between the bearing surfaces.

An object of the invention is to provide a control system for a machine which shall function in response to starting operations to permit the starting of the machine only after predetermined conditions precedent to the proper starting of the machine have been fulfilled.

Another object of the invention is to provide a control system for rotating machine which shall function to prevent the application of rotating forces to the machine until predetermined oil pressures are established in the bearings of the machine.

These and other objects and advantages of the invention will be apparent from the following detailed description taken in connection with the accompanying drawing the single figure of which is a diagrammatic representation of a control system for a motor embodying the principal features of the invention.

In practicing a preferred embodiment of the invention, a wound rotor induction motor 2 has its stator windings connected to be energized by a suitable source of alternating-current power as indicated. The rotor winding is connected to an alternating-current machine 4 which is connected in driving relation with a direct-current machine 6.

Circuit control devices R and L in cooperation with their associated control circuits function to so control a motor-operated variable resistor 8 as to vary the excitation of the motor 6. An oil pump motor 10 is connected to operate oil pumps 12 and 14 in response to the operation of the circuit control device R, auxiliary relays 15 and 16, a frequency responsive device 17 and pressure responsive devices 18 and 20, together with a time delay relay 22 and a toggle relay 24, to permit the circuit control device R to so operate the variable resistor 8 as to start the motor 2.

Considering the invention more in detail, the rheostat 8 may be actuated by a motor 26 whose armature and field winding 28 may be energized by a circuit control device L to increase the effective resistance value of the rheostat 8 and thereby decrease the energization of the field winding 30 of the direct-current machine 6. The armature and field winding 32 of the motor 26 may be energized in a circuit controlled by the circuit control device R and a contact element 34 of the relay 24, to thereby so operate the motor as to decrease the effective resistance value of the rheostat 8 to thereby increase the excitation of the direct-current machine 6.

The frequency responsive device 17 comprises a movable contact element 36 disposed to be moved into engagement with a fixed contact element 38 when the energization of an actuating solenoid 40 is greater than the energization of a solenoid 42 which is disposed to oppose the force of the solenoid 40. The solenoid 40 is disposed to be energized in series circuit relation with a resistor 44 in accordance with the potential between the conductors extending between the rotor winding of the induction motor 2 and the winding of the alternating current machine 4. The solenoid 42 is connected to be energized in series circuit relation with an inductor 46 in accordance with the potential between the conductors which extend between the machines 2 and 4. It will be seen that as the frequency acting on the circuit of the solenoids 40 and 42 increases, the energization of solenoid 42 will decrease because of the increased impedance of the inductor 46 with the increase in the frequency of the potential acting upon it. At a predetermined frequency for which the frequency responsive device 17 may be designed, the solenoid 40 will overcome the opposing force of the solenoid 42 to move the contact element 36 into engagement with the contact element 38.

The bearings 48 and 50 of the induction motor 2 may be supplied with oil under pressure by the pumps 12 and 14 through conduits 52 and 54, respectively. The pumps 12 and 14 are driven by a motor 10 which may be energized by a contact element 56 of the relay 16. The relay 16 may, in turn, be energized in a circuit controlled by a contact element 58 of the relay 15 and the contact elements 36 and 38 of the frequency responsive device 17.

The toggle relay 24 comprises contact elements 60 and 34 which may be moved to the position shown in the drawing by a relay winding 62 and from this position to a left hand contact position by a relay winding 64. The relay winding 64 is disposed to be energized in a circuit controlled by a contact element 66 of the relay 22 in actuated position, the contact element 60 of the toggle relay 24, the contact element 58 of the relay 15, and the contact elements 36 and 38 of the frequency responsive device 17. The relay winding 62 is disposed to be energized in a circuit controlled by the contact element 66 of the relay 22 in released position, the contact element 60 of the toggle relay 24 in the left hand circuit-closing position, the contact element 58 of the relay 15 and the contact elements 36 and 38 of the frequency responsive device 17.

In the operation of the system, when it is desired to start the induction motor 2 the circuit control device L may be manually actuated to cause the motor operated rheostat 8 to decrease the excitation of the direct-current machine 6 which will operate as a motor to drive the alternating current machine 4 as an alternating current generator to thereby increase the frequency of energization of the rotor windings of the induction motor 2. When the frequency of energization of the rotor windings of the induction motor 2 has been increased to approximately the frequency of the three phase power supply, the frequency responsive device 17 will close its contact elements. With the frequency of energization of the rotor windings substantially equal to the frequency of the source of supply a circuit breaker 72 may be closed to energize the stator windings of the motor 2. The circuit breaker 72 may be controlled by hand or by any desired automatic means which will respond to the condition of synchronism between the potentials induced in the stator of the motor 2 and the potential of the three phase supply. With the motor 2 energized from the three phase supply and from the alternating current machine 4 at a frequency equal to that of the three phase supply, the motor 2 will act as an unloaded transformer and there will be no transfer of power through it.

The motor 2 may now be started by manually actuating the circuit control device R which will cause the actuation of the relay 15. The contact element 58 of the relay 15, together with the contact elements 36 and 38 of the frequency responsive device 17, will energize the relay 16 which in turn will actuate its contact element 56 to energize the pump motor 10. When the pumps 12 and 14 have built up sufficient oil pressure in the bearings 48 and 50, the pressure responsive devices 18 and 20 will close contact elements 68 and 70 to energize the time delay relay 22. Upon the actuation of the relay 22, the relay windings 64 will be energized in the hereinbefore described circuit to move the contact element 34 to the closed circuit position, thereby energizing the motor 26 and causing it to rotate in a direction to increase the excitation of the direct current machine 6. There will now be a power transfer through the induction motor 2 to drive the alternating current machine 4 as a synchronous motor and the machine 4 will in turn drive the direct-current machine 6 as a direct-current generator. With the machine 4 acting as a motor to drive the machine 6, the speed of the induction motor 2 will vary directly with the decrease of the speed of the machine 4, and the decrease of the speed of the machine 4 will be proportional to the increase in the excitation of the machine 6.

After the motor 2 has started the frequency of the potential acting between the motor 2 and the alterating current machine 4 will decrease to thereby permit the contact element 36 to disengage the contact element 38, this will deenergize the relay 16 to stop the pumps 12 and release the contact elements 68 and 70. The opening of the contact elements 68 and 70 will deenergize the relay 22 whose contact elements 66 will be moved to the lower contact position.

The speed of the motor 2 may now be varied at will by the selective actuation of the circuit control devices L and R to lower and raise the excitation of the machine 6 and thereby lower and raise the speed of the motor 2. If at any time the speed of the motor 2 is lowered to zero by the decrease in the excitation of the machine 6, the frequency responsive device 17 will close its contact elements 36 and 38. If now it is desired to again increase the speed of the motor 2 when the circuit control device R is actuated, the relay 15 will be energized and the contact element 58 of the relay 15, together with the contact elements 36 and 38 of the frequency responsive device 17, the contact element 60 of the relay 24 in the left hand circuit closing position, and the contact element 66 in the lower circuit closing position will cause the energization of the relay winding 62, and to thereby move the contact element 34 of the relay 24 to open circuit position and the contact element 60 of the relay 24 to the right hand closed circuit position. The movement of the contact element 34 to open circuit position will thus prevent the motor 26 from operating in a direction to increase the excitation of the machine 6 and the relays 15, 16 and 17 will again cause the pumps 12 and 14 to build up oil pressure in the bearings 48 and 50 before the relay 22 may be again energized to in turn energize the relay winding 64 to close the contact element 34 and permit the motor 26 to operate in the direction to increase the excitation of the machine 6.

The relay 22 may be time delayed in picking up to assure that the oil pressure has been built up sufficiently in the bearings 48 and 50 and may be time delayed in releasing to insure that there is sufficient rotation of the motor 2 to release the frequency responsive device 17 before permitting the contact element 66 of the relay 22 to move to the lower contact position.

Thus it will be seen that I have provided a control system for a rotating machine which shall function to control the starting and the speed of the machine and which shall function to prevent the application of rotating forces to the machine until predetermined oil pressures are established in the bearings of the machine.

In compliance with the requirements of the patent statutes, I have shown and described herein a preferred embodiment of my invention. It is to be understood, however, that the invention is not limited to the precise construction shown and described but is capable of modification by one skilled in the art, the embodiments herein shown being merely illustrative of the principles of my invention.

I claim as my invention:

1. In a control system for a rotating induction machine having primary and secondary reacting windings, means for energizing one of the windings, other means for energizing the other winding, relay means operable in response to the conditions of energization of said other winding which are proper for starting the machine, a circuit control device, means for applying oil pressure to the bearings of the machine, means responsive to the operation of the relay means and the circuit control device for actuating the oil pressure applying means, and means responsive to predetermined bearing oil pressure and the operation of the circuit control device for starting the machine.

2. In a control system for a wound-rotor induction motor, means for applying alternating current power of substantially constant frequency to one of the windings of the induction motor, means for applying an alternating current potential of selectively variable frequency to the other winding of the induction motor, relay means operable at a predetermined minimum frequency of the variable frequency potential, means for applying oil pressure to the bearings of the motor, a circuit control device, means responsive to the operation of the circuit control device and the relay means for actuating said oil pressure applying means, means for starting the motor, and means responsive to the operation of the circuit control device and a predetermined bearing oil pressure for actuating said motor starting means.

3. In a control system for an induction motor having primary and secondary windings, means energizing one of the windings from a source of alternating current power, a second source of alternating current power for energizing the other winding of the induction motor, means for increasing the frequency of the second source of power, relay means responsive to a predetermined minimum frequency of the second source of power, control means for decreasing the frequency of the second source of power including a circuit control device and an auxiliary relay, means responsive to the operation of the circuit control device and the frequency responsive relay means for applying oil pressure to the bearings of the motor, and means responsive to a predetermined bearing oil pressure and the frequency responsive relay means for actuating said auxiliary relay.

4. In a control system for an induction motor having primary and secondary windings, means energizing one of the windings from a source of alternating current power, an alternator connected to energize the other motor windings, means for increasing the frequency of the alternate, relay means responsive to a predetermined minimum alternator current frequency, control means for decreasing the speed of the alternator including a circuit control device and an auxiliary relay, means responsive to the operation of the circuit control device and the frequency responsive relay means for applying oil pressure to the bearings of the motor, and means responsive to a predetermined bearing oil pressure and the frequency responsive relay means for actuating said auxiliary relay.

5. In a control system for an induction motor having primary and secondary reacting windings, means energizing one of the windings from a source of alternating current power, an alternating current machine electrically connected with the other winding, a direct current dynamo-electric machine, means connecting the alternating-current machine and the direct current machine in driving relation, means for increasing the excitation of the direct current machine, means for decreasing the excitation of the direct current machine comprising a manual circuit control device and a relay, means responsive to the operation of the circuit control device and a predetermined frequency of potential acting on the said other winding of the induction motor for applying oil pressure to the bearings of the induction motor, and means responsive to a predetermined oil pressure for energizing said relay.

6. In a control system for an induction motor having primary and secondary reacting windings, means energizing one of the windings from a source of alternating current power, an alternating current machine electrically connected with the other winding, a direct current dynamo-electric machine, means connecting the alternating-current machine and the direct current machine in driving relation, means for increasing the excitation of the direct current machine, means for decreasing the excitation of the direct current machine comprising a manual circuit control device and a relay, means responsive to the operation of the circuit control device and a predetermined frequency of potential acting on the said other winding of the induction motor for applying oil pressure to the bearings of the induction motor, means responsive to a predetermined oil pressure for energizing said relay, and means responsive to a subsequent simultaneous operation of said manual circuit control device and said predetermined frequency for releasing said relay from control relation with said excitation decreasing means.

7. In a control system for an induction motor having stator and rotor windings, means for energizing one of said windings from a power source, means for energizing the other of said windings with alternating current of variable frequency, means for applying oil pressure to the bearings of the motor, means including relay means responsive to the frequency of the energizing potential applied to the said other winding of the motor for initiating the operation of the means for applying oil pressure, and means rendered effective in response to a predetermined oil pressure in the bearings for controlling the operation of the means for energizing said other winding to start and vary the speed of the induction motor.

8. In a control system for a wound rotor induction motor having stator and rotor windings, means operable to connect the stator winding to a source of alternating current power, an alternating-current machine connected to the rotor winding, a direct-current, dynamo-electric machine connected in driving relation with the alternating-current machine, a motor-operated rheostat operable to vary the excitation of the direct-current machine, first switch means operable to effect operation of the motor-operated rheostat to decrease the excitation of the direct-current machine to cause the rotor winding to be energized at a frequency corresponding to the speed of the direct-current machine, whereby the rotor winding may be energized at the frequency of the source of alternating-current power and the stator winding connected thereto, means operable to apply oil pressure to the bearings of the induction motor, relay means responsive to a predetermined frequency of the potential applied to the rotor winding by the alternating-current machine, means including second switch means rendered effective in response to the operation of the frequency responsive relay means for initiating operation of the oil pressure applying means, and relay means responsive to a predetermined oil pressure operable to render the second switch means effective to control the operation of the motor-operated rheostat, whereby the excitation of the direct-current machine may be increased to start the induction motor and increase the speed thereof.

ROBERT R. LONGWELL.